(No Model.)
A. A. FREEMAN.
FISHING LINE SNOOD AND CORK HOLDER.
No. 585,564. Patented June 29, 1897.
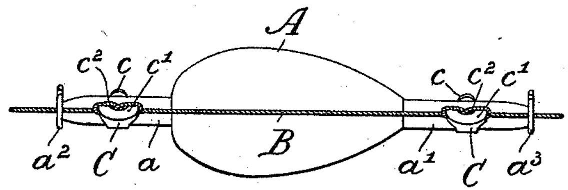
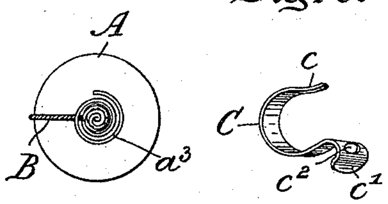
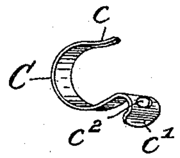
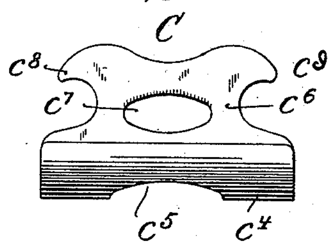
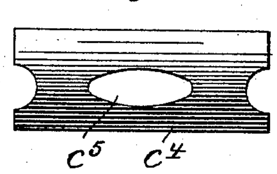
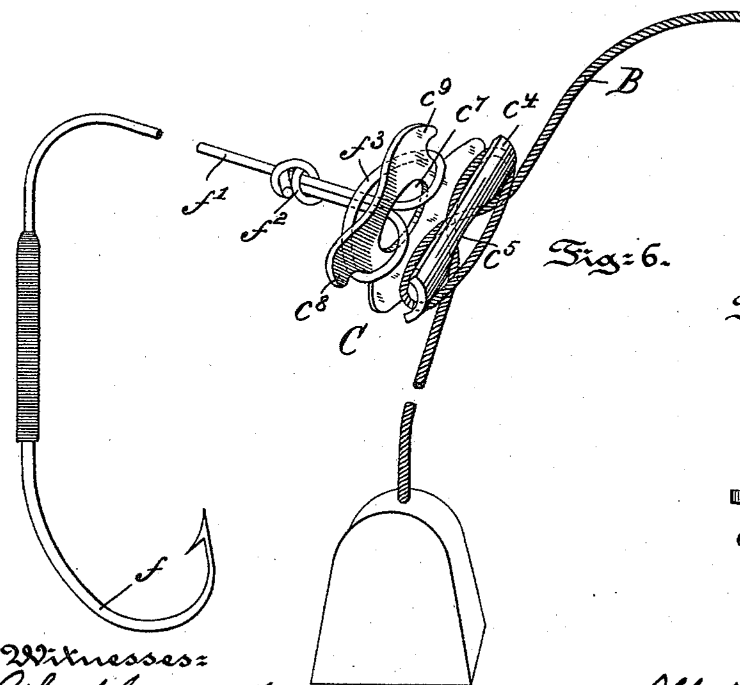
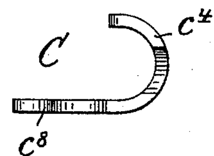
Witnesses:
Richard C. Maxwell
Thomas M. Smith.
Inventor:
Albert A. Freeman,
By J. Walter Douglass
Attorney.
THE NORRIS PETERS CO., PHOTO-LITHO., WASHINGTON, D. C.

UNITED STATES PATENT OFFICE.

ALBERT A. FREEMAN, OF PHILADELPHIA, PENNSYLVANIA.

FISHING-LINE SNOOD AND CORK HOLDER.

SPECIFICATION forming part of Letters Patent No. 585,564, dated June 29, 1897.

Application filed September 25, 1896. Serial No. 606,936. (No model.)

*To all whom it may concern:*

Be it known that I, ALBERT A. FREEMAN, a citizen of the United States, residing at the city of Philadelphia, in the county of Philadelphia and State of Pennsylvania, have invented certain new and useful Improvements in a Combined Snood and Cork Holder for Fishing-Lines, of which the following is a specification.

My invention has relation to combined snood and cork holders for a fishing-line whereby the former or snood may be readily or securely made fast and the latter or cork have a line readily attached to or detached from a holder adapted to be clamped to the stem or quill, or both, of the cork; and to which end my invention consists of a holder constructed and arranged in substantially the manner hereinafter described and claimed.

The nature and general scope of my invention will be more fully understood from the following description, taken in connection with the accompanying drawings, forming part hereof, in which—

Figure 1 is a side view of a fishing-cork having clamped to the stems thereof holders detachably engaging the line and adapted to hold the same in connection with the cork. Fig. 2 is an end view of Fig. 1. Fig. 3 is a perspective view of one form of the holder for a line adapted to be clamped to the stem or quill of the cork. Fig. 4 is a front view of the holder with which the line and snood are made fast. Fig. 5 is a top or plan view of the same. Fig. 6 is a perspective view showing the application of the holder to the snood and of the line containing a dipsey connected therewith, and Fig. 7 is a side view of said device.

Referring to the drawings with reference to Figs. 1, 2, and 3, A is the cork, provided with upper and lower stems $a$ and $a'$, carrying at the respective ends spiral engaging clamps $a^2$ and $a^3$, with which the line B is detachably connected.

C is the holder, of metal, bent into a U shape in the main body thereof and having a slightly bent-out end $c$, the opposite end being bent outward and downward into a lip $c'$, and is provided in the body thereof with an opening $c^2$, through which is inserted in loop form the line B, which is given a turn and the loop portion brought into engagement with the downward lip $c'$ of the clamp and then drawn in opposite directions, to thereby secure the line in engagement with the slotted portion of the clamp, as illustrated in Fig. 1 of the drawings. The U-shaped portion of the clamp C is then brought into engagement with the stem $a$ or quill $a'$, as clearly shown in Fig. 1 of the drawings, to thereby securely maintain the cord or line in connection with the cork.

In the form shown in Figs. 4 to 7, inclusive, the holder consists of a recessed U-shaped portion $c^4$, having an oblong slot $c^5$, in this instance formed in the body thereof. Opposite to the free end of the U-shaped portion of the holder is provided an elongation $c^6$, having an oblong slot $c^7$ therein, and this elongation terminates in a T-shaped projection. The T is arranged so that the members $c^8$ and $c^9$ thereof are bent slightly downward and curved, as clearly shown in Figs. 5 and 6 of the drawings, whereby the hook $f$, provided with a catgut snood or loop at the upper end $f'$, is adapted to be brought into engagement with the holder C and securely fastened or twisted thereto in a manner to be presently explained. A knot $f^2$ is formed in the gut to constitute the loop $f^3$, which is inserted through the oblong openings $c^7$ of the elongation of the clamp C and the loop made to embrace the vertical portion adjacent to the T arms or members to secure the snood fast thereto.

The line B is introduced through the oblong opening $c^5$ in the recessed U-shaped portion of the holder and given a turn and then brought downward into the recesses and trough of the U-shaped portion of the device to secure the same to position therein with the cord or line in firm engagement therewith—for example, in the manner illustrated in Fig. 6 of the drawings—whereby is provided a device in which the snood of a fishing-line may be efficiently and expeditiously secured and held with the least possible labor attending the same and the line readily and quickly established with the device and at the same time both adapted to be disengaged therefrom for resnooding or of attaching another line to the holder C and the cork adapted to be established with the line by means of the clamp-holders connected with the stems or quills $a$ and $a'$ thereof and, moreover, against any drawing of the line when applied to the cork stems or quills or slip of the line in use from the position it is caused to assume in connection with the holders applied thereto.

Having thus described the nature and objects of my invention, what I claim as new, and desire to secure by Letters Patent, is—

1. A combined cork and snood holder for fish-lines, comprising a curved metallic device having at one end a slot through which the line is passed to secure the device to the line, said device having fastening means at its other end, whereby the cork or snood may be secured to the device, substantially as and for the purposes described.

2. A snood-holder for fish-lines, comprising a curved metallic device consisting of the slotted members, one of said members adapted to receive and retain a loop of the line and the other member adapted to receive and retain the snood-loop, substantially as and for the purposes described.

3. The combination, with a line and a snood, of a curved metal device provided with a slot and with a lateral extension having an opening and recessed lips or arms for detachably making fast said snood and the slotted body of said device adapted to detachably secure said line thereto, substantially as and for the purposes described.

In testimony whereof I have hereunto set my signature in the presence of two subscribing witnesses.

ALBERT A. FREEMAN.

Witnesses:
J. WALTER DOUGLASS,
THOMAS M. SMITH.